United States Patent
Kim et al.

(10) Patent No.: US 10,651,988 B2
(45) Date of Patent: May 12, 2020

(54) METHOD AND DEVICE FOR SELECTING MULTIPLE USERS AND ALLOCATING RESOURCES FOR NON-ORTHOGONAL MULTIPLE ACCESS IN WIRELESS COMMUNICATION SYSTEM

(71) Applicants: LG ELECTRONICS INC., Seoul (KR); INDUSTRY-ACADEMIC COOPERATION FOUNDATION, YONSEI UNIVERSITY, Seoul (KR)

(72) Inventors: Heejin Kim, Seoul (KR); Kwangsoon Kim, Seoul (KR); Kyungjun Choi, Seoul (KR); Jiwon Kang, Seoul (KR)

(73) Assignees: LG ELECTRONICS INC., Seoul (KR); INDUSTRY-AVADEMIC COOPERATION FOUNDATION, YONSEI UNIVERSITY, Seoul (KR)

( * ) Notice: Subject to any disclaimer, the term of this patent is extended or adjusted under 35 U.S.C. 154(b) by 210 days.

(21) Appl. No.: 15/735,136

(22) PCT Filed: May 12, 2016

(86) PCT No.: PCT/KR2016/005009
§ 371 (c)(1),
(2) Date: Dec. 8, 2017

(87) PCT Pub. No.: WO2016/200066
PCT Pub. Date: Dec. 15, 2016

(65) Prior Publication Data
US 2018/0152273 A1    May 31, 2018

Related U.S. Application Data

(60) Provisional application No. 62/173,966, filed on Jun. 11, 2015.

(30) Foreign Application Priority Data

Jan. 15, 2016 (KR) .................. 10-2016-0005273

(51) Int. Cl.
*H04L 5/00* (2006.01)
*H04W 72/04* (2009.01)
(Continued)

(52) U.S. Cl.
CPC ......... *H04L 5/0048* (2013.01); *H04B 7/0452* (2013.01); *H04B 7/0617* (2013.01);
(Continued)

(58) Field of Classification Search
CPC .. H04B 7/0452; H04B 7/0486; H04B 7/0617; H04B 7/0639; H04L 5/0057;
(Continued)

(56) References Cited

U.S. PATENT DOCUMENTS

2008/0108390 A1* 5/2008 Yoon .................... H04B 7/0617
455/561
2010/0322109 A1* 12/2010 Ahn ...................... H04L 5/0062
370/254
(Continued)

FOREIGN PATENT DOCUMENTS

WO    2014122994    8/2014

OTHER PUBLICATIONS

PCT International Application No. PCT/KR2016/005009, Written Opinion of the International Searching Authority dated Aug. 17, 2016, 16 pages.
(Continued)

*Primary Examiner* — Mark H Rinehart
*Assistant Examiner* — Kokou R Detse
(74) *Attorney, Agent, or Firm* — Lee, Hong, Degerman, Kang & Waimey

(57) ABSTRACT

The present application provides a method for allocating resources in a wireless communication system using mul-
(Continued)

tiple antennas. The method for allocating resources comprising: transmitting a reference signal to first-type terminals based on type information of a plurality of terminals; receiving channel estimation information from the first-type terminals that have received the reference signal; generating beams based on the received channel estimation information; and allocating resources for the generated beams. First-type beams for the first-type terminals are primarily generated and allocated, and on the basis of the generated first-type beams, second-type beams for second-type terminals may be non-orthogonally generated and allocated when the resources for the beams are allocated.

15 Claims, 16 Drawing Sheets

(51) Int. Cl.
  *H04B 7/0452* (2017.01)
  *H04B 7/06* (2006.01)
  *H04B 7/0456* (2017.01)
  *H04W 88/02* (2009.01)
  *H04W 88/08* (2009.01)
(52) U.S. Cl.
  CPC ......... *H04B 7/0639* (2013.01); *H04B 7/0678* (2013.01); *H04B 7/0695* (2013.01); *H04L 5/005* (2013.01); *H04L 5/0057* (2013.01); *H04W 72/044* (2013.01); *H04W 72/046* (2013.01); *H04W 72/0413* (2013.01); *H04B 7/0486* (2013.01); *H04W 88/02* (2013.01); *H04W 88/08* (2013.01)

(58) Field of Classification Search
  CPC .............. H04L 5/0048; H04W 72/044; H04W 72/0413; H04W 72/046
  USPC ........................................................ 370/329
  See application file for complete search history.

(56) References Cited

U.S. PATENT DOCUMENTS

| 2014/0314006 | A1* | 10/2014 | Suh ...................... | H04B 7/0452 |
| | | | | 370/329 |
| 2015/0163043 | A1* | 6/2015 | Lee ........................ | H04L 5/0073 |
| | | | | 370/336 |
| 2016/0308279 | A1* | 10/2016 | Athley ................... | H01Q 1/246 |
| 2017/0250743 | A1* | 8/2017 | Jongren ................ | H04B 7/0456 |
| 2018/0146491 | A1* | 5/2018 | Kim ...................... | H04W 24/10 |

OTHER PUBLICATIONS

NTT DOCOMO, "Evaluation methodologies for downlink multiuser superposition transmissions", 3GPP TSG RAN WG1 Meeting #81, R1-153332, May 2015, 7 pages.
MEDIATEK, "Downlink Multiuser Superposition Transmission Scheme", 3GPP TSG RAN WG1 Meeting #81, R1-153044, May 2015, 5 pages.
NTT DOCOMO, "Justification for NOMA in New Study on Enhanced Multi-User Transmission and Network Assisted Interference Cancellation for LTE", 3GPP TSG RAN Meeting #66, RP-141936, Dec. 2014, 15 pages.

* cited by examiner (a)

(b)

(a) OFDMA (b) NOMA $B = [\,b_1, b_2 ..., b_N\,]$

ND DEVICE FOR SELECTING
METHOD AND DEVICE FOR SELECTING MULTIPLE USERS AND ALLOCATING RESOURCES FOR NON-ORTHOGONAL MULTIPLE ACCESS IN WIRELESS COMMUNICATION SYSTEM

CROSS-REFERENCE TO RELATED APPLICATIONS

This application is the National Stage filing under 35 U.S.C. 371 of International Application No. PCT/KR2016/005009, filed on May 12, 2016, which claims the benefit of earlier filing date and right to priority to Korean Application No. 10-2016-0005273, filed on Jan. 15, 2016, and also claims the benefit of U.S. Provisional Application No. 62/173,966, filed on Jun. 11, 2015, the contents of which are all hereby incorporated by reference herein in their entirety.

TECHNICAL FIELD

The present invention relates to a wireless communication system, and more particularly, to a method performed by a base station with multiple antennas for transmitting and receiving signals and allocating resources based on non-orthogonal multiple access (NOMA).

BACKGROUND ART

A brief description will be given of a 3rd Generation Partnership Project Long Term Evolution (3GPP LTE) system as an example of a wireless communication system to which the present invention can be applied.

FIG. 1 illustrates a configuration of an Evolved Universal Mobile Telecommunications System (E-UMTS) network as an exemplary wireless communication system. The E-UMTS system is an evolution of the legacy UMTS system and the 3GPP is working on the basics of E-UMTS standardization. E-UMTS is also called an LTE system. For details of the technical specifications of UMTS and E-UMTS, refer to Release 7 and Release 8 of "3rd Generation Partnership Project; Technical Specification Group Radio Access Network", respectively.

Referring to FIG. 1, the E-UMTS system includes a User Equipment (UE), an evolved Node B (eNode B or eNB), and an Access Gateway (AG) which is located at an end of an Evolved UMTS Terrestrial Radio Access Network (E-UTRAN) and connected to an external network. The eNB may transmit multiple data streams simultaneously, for broadcast service, multicast service, and/or unicast service.

A single eNB manages one or more cells. A cell is set to operate in one of the bandwidths of 1.25, 2.5, 5, 10, 15 and 20 Mhz and provides Downlink (DL) or Uplink (UL) transmission service to a plurality of UEs in the bandwidth. Different cells may be configured so as to provide different bandwidths. An eNB controls data transmission and reception to and from a plurality of UEs. Regarding DL data, the eNB notifies a particular UE of a time-frequency area in which the DL data is supposed to be transmitted, a coding scheme, a data size, Hybrid Automatic Repeat reQuest (HARQ) information, etc. by transmitting DL scheduling information to the UE. Regarding UL data, the eNB notifies a particular UE of a time-frequency area in which the UE can transmit data, a coding scheme, a data size, HARQ information, etc. by transmitting UL scheduling information to the UE. An interface for transmitting user traffic or control traffic may be defined between eNBs. A Core Network (CN) may include an AG and a network node for user registration of UEs. The AG manages the mobility of UEs on a Tracking Area (TA) basis. A TA includes a plurality of cells.

Although radio communication technology has been developed up to LTE based on WCDMA, demands and expectations of users and providers continue to increase.

DISCLOSURE OF THE INVENTION

Technical Task

An object of the present invention is to provide a method performed by a base station with multiple antennas for transmitting and receiving signals based on NOMA in a wireless communication system and device therefor.

Another object of the present invention is to provide a method performed by a base station with multiple antennas for allocating resources based on NOMA in a wireless communication system and device therefor.

A further object of the present invention is to provide a method for transmitting and receiving signals based on closed-loop multi-input multi-output (MIMO) and open-loop MIMO in a wireless communication system and device therefor.

A still further object of the present invention is to provide a method for transmitting and receiving signals based on types of user equipments in a wireless communication system and device therefor.

Technical Solutions

The object of the present invention can be achieved by providing a method of a method for allocating resources in a wireless communication system using multiple antennas, the method comprising: transmitting reference signals to first-type user equipments (UEs) based on type information on a plurality of UEs; receiving channel estimation information from the first-type UEs that receive the reference signals; generating beams based on the received channel estimation information; and allocating resources for the generated beams, wherein when the resources are allocated for the beams, first-type beams for the first-type UEs are first generated and allocated, and then second-type beams for second-type UEs are generated and allocated based on the generated first-type beams in a non-orthogonal manner.

In another aspect of the present invention, provided herein is a base station for allocating resources in a wireless communication system using multiple antennas, the BS comprising: a reception module configured to receive information from an external device; a transmitting module configured to transmit information to the external device; and a processor controlling the receiving and transmitting modules, wherein the processor is configured to: using the transmitting module, transmit reference signals to first-type user equipments (UEs) based on type information on a plurality of UEs; using the receiving module, receive channel estimation information from the first-type UEs that receive the reference signals; generate beams based on the received channel estimation information; and allocate resources for the generated beams, wherein when the resources are allocated for the beams, first-type beams for the first-type UEs are first generated and allocated, and then second-type beams for second-type UEs are generated and allocated based on the generated first-type beams in a non-orthogonal manner.

In addition, the following matters are commonly applicable to the method of allocating resources and BS in the wireless communication system.

In one embodiment of the present invention, the first-type and second-type beams are allocated together in one resource region in a non-orthogonal manner. The one resource region is divided into a first space including Nc of the first-type beams and a second space including No of the second-type beams based on the multiple antennas.

In one embodiment of the present invention, after generation of the first space, the second space is generated based on the generated first space.

In one embodiment of the present invention, the second space is divided based on a beam codebook.

In one embodiment of the present invention, the No second-type beams included in the second space are transmitted based on a hopping pattern.

In one embodiment of the present invention, the No second-type beams included in the second space are transmitted based on a spreading pattern.

In one embodiment of the present invention, the first-type beams are closed-loop beams and the second-type beams are open-loop beams.

In one embodiment of the present invention, the first-type UEs are human-type UEs and the second-type UEs are machine-type UEs.

In one embodiment of the present invention, further comprising receiving type information on each UE from the plurality of UEs. The type information on each UE is received through a physical uplink shared channel (PUSCH).

Advantageous Effects

According to the present invention, it is possible to provide a method performed by a base station with multiple antennas for transmitting and receiving signals based on NOMA in a wireless communication system and device.

According to the present invention, it is possible to provide a method performed by a base station with multiple antennas for allocating resources based on NOMA in a wireless communication system and device therefor.

According to the present invention, it is possible to provide a method for transmitting and receiving signals based on closed-loop MIMO and open-loop MIMO in a wireless communication system and device therefor.

According to the present invention, it is possible to provide a method for transmitting and receiving signals based on types of user equipments in a wireless communication system and device therefor.

It will be appreciated by persons skilled in the art that the effects that can be achieved through the present invention are not limited to what has been particularly described hereinabove and other advantages of the present invention will be more clearly understood from the following detailed description.

BEST MODE FOR INVENTION

Figure 1:
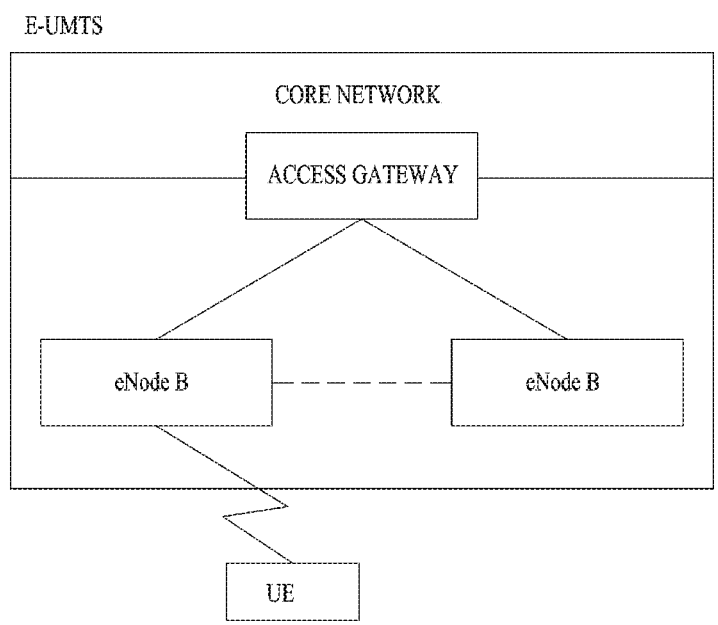
FIG. 1 is a schematic diagram illustrating the E-UMTS network structure as an example of a wireless communication system.

The embodiments described below are constructed by combining elements and features of the present invention in a predetermined form. The elements or features may be considered selective unless explicitly mentioned otherwise. Each of the elements or features can be implemented without being combined with other elements. In addition, some elements and/or features may be combined to configure an embodiment of the present invention. The sequence of the operations discussed in the embodiments of the present invention may be changed. Some elements or features of one embodiment may also be included in another embodiment or may be replaced by corresponding elements or features of another embodiment.

The embodiments of the present invention will be described, focusing on a data communication relationship between a base station and a terminal. The base station serves as a terminal node of a network over which the base station directly communicates with the terminal. Specific operations illustrated as being conducted by the base station in this specification may also be conducted by an upper node of the base station, as necessary.

In other words, it will be obvious that various operations allowing for communication with the terminal in a network composed of several network nodes including the base station can be conducted by the base station or network nodes other than the base station. The term "base station (BS)" may be replaced with terms such as "fixed station," "Node-B," "eNode-B (eNB)," and "access point". The term "relay" may be replaced with such terms as "relay node (RN)" and "relay station (RS)". The term "terminal" may also be replaced with such terms as "user equipment (UE)," "a mobile station (MS)," "mobile subscriber station (MSS)" and "subscriber station (SS)".

It should be noted that specific terms disclosed in the present invention are proposed for convenience of description and better understanding of the present invention, and these specific terms may be changed to other formats within the technical scope or spirit of the present invention.

In some cases, known structures and devices may be omitted or block diagrams illustrating only key functions of the structures and devices may be provided, so as not to obscure the concept of the present invention. The same reference numbers will be used throughout this specification to refer to the same or like parts.

Exemplary embodiments of the present invention are supported by standard documents disclosed for at least one of wireless access systems including an institute of electrical and electronics engineers (IEEE) 802 system, a 3rd generation partnership project (3GPP) system, a 3GPP long term evolution (LTE) system, an LTE-advanced (LTE-A) system, and a 3GPP2 system. In particular, steps or parts, which are not described in the embodiments of the present invention to prevent obscuring the technical spirit of the present invention, may be supported by the above documents. All terms used herein may be supported by the above-mentioned documents.

The embodiments of the present invention described below can be applied to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA may be embodied through wireless technologies such as universal terrestrial radio access (UTRA) or CDMA2000. TDMA may be embodied through wireless technologies such as global system for mobile communication (GSM)/general packet radio service (GPRS)/enhanced data rates for GSM evolution (EDGE). OFDMA may be embodied through wireless technologies such as IEEE 802.11 (Wi-Fi), IEEE 802.16 (WiMAX), IEEE 802-20, and evolved UTRA (E-UTRA). UTRA is a part of universal mobile telecommunications system (UMTS). 3rd generation partnership project (3GPP) long term evolution (LTE) is a part of evolved UMTS (E-UMTS), which uses E-UTRA. 3GPP LTE employs OFDMA for downlink and employs SC-FDMA for uplink. LTE-Advanced (LTE-A) is an evolved version of 3GPP LTE. WiMAX can be explained by IEEE 802.16e (wirelessMAN-OFDMA reference system) and advanced IEEE 802.16m (wirelessMAN-OFDMA advanced system). For clarity, the following description focuses on 3GPP LTE and 3GPP LTE-A systems. However, the spirit of the present invention is not limited thereto.

Figure 2:
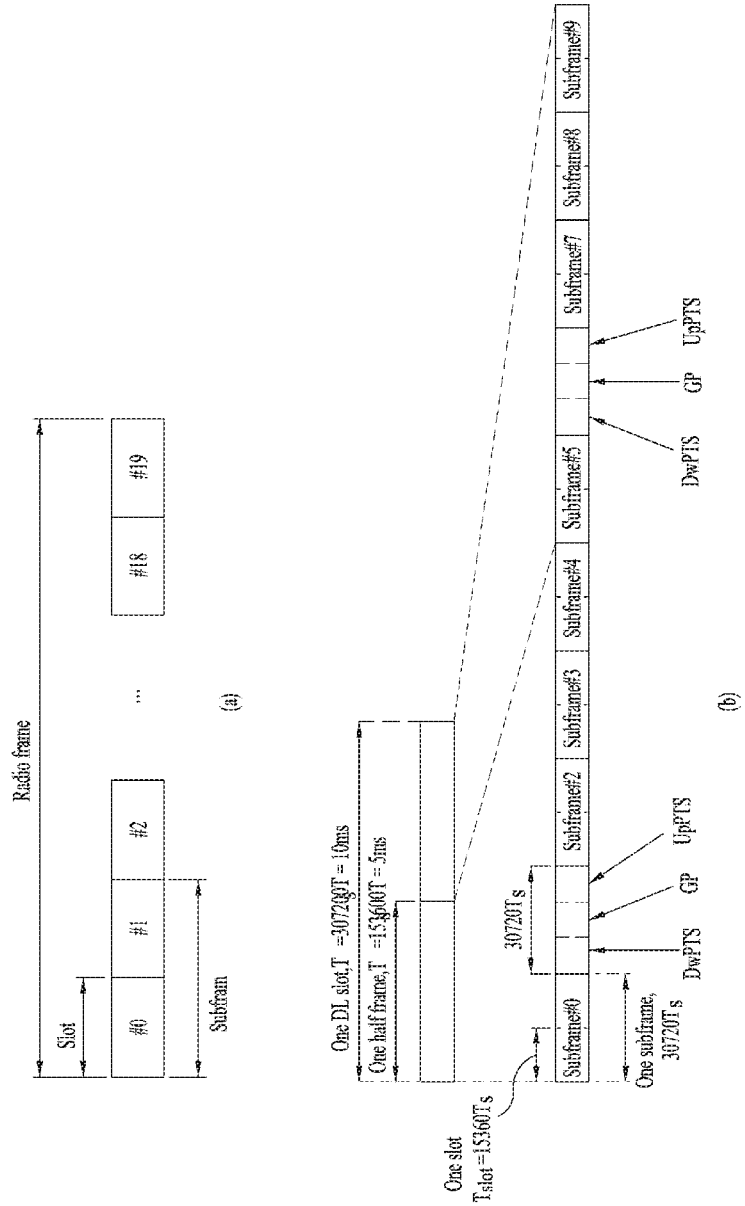
FIG. 2 is a diagram for explaining the structure of a radio frame.

FIG. 2 is a diagram for explaining a structure of a radio frame.

In a cellular OFDM wireless packet communication system, an uplink/downlink data packet is transmitted on a subframe basis, and one subframe is defined as a predetermined time interval including a plurality of OFDM symbols. 3GPP LTE standard supports a type-1 radio frame structure applicable to frequency division duplex (FDD) and a type-2 radio frame structure applicable to time division duplex (TDD).

FIG. 2(a) illustrates the type-1 radio frame structure. A downlink radio frame is divided into 10 subframes. Each subframe is further divided into two slots in the time domain. A unit time during which one subframe is transmitted is defined as transmission time interval (TTI). For example, one subframe may be 1 ms in duration, and one slot may be 0.5 ms in duration. A slot may include a plurality of orthogonal frequency division multiplexing (OFDM) symbols in the time domain and includes a plurality of resource blocks (RBs) in the frequency domain. Since the 3GPP LTE system adopts OFDMA for downlink, an OFDM symbol represents one symbol period. An OFDM symbol may be referred to as an SC-FDMA symbol or symbol period. A Resource Block (RB) is a resource allocation unit including a plurality of consecutive subcarriers in a slot.

The number of OFDM symbols included in one slot may be changed according to the configuration of a Cyclic Prefix (CP). The CP includes an extended CP and a normal CP. For example, if the OFDM symbols are configured with the normal CP, the number of OFDM symbols included in one slot may be seven. If the OFDM symbols are configured with the extended CP, the length of one OFDM symbol is increased, and thus the number of OFDM symbols included in one slot is less than that of the case of the normal CP. In the case of the extended CP, for example, the number of OFDM symbols included in one slot may be six. If a channel state is instable, for example, if a UE moves at a high speed, the extended CP may be used to further reduce interference between symbols.

When the normal CP is used, one subframe includes 14 OFDM symbols because one slot includes seven OFDM symbols. At this time, the first two or three OFDM symbols of each subframe may be allocated for a Physical Downlink Control Channel (PDCCH) and the remaining OFDM symbols may be allocated for a Physical Downlink Shared Channel (PDSCH).

FIG. 2(b) illustrates the type-2 radio frame structure. The type-2 radio frame includes two half frames, each of which has 5 subframes, a Downlink Pilot Time Slot (DwPTS), a Guard Period (GP), and an Uplink Pilot Time Slot (UpPTS). Each subframe is divided into two slots. The DwPTS is used for initial cell search, synchronization, or channel estimation at a UE. The UpPTS is used for channel estimation and acquisition of uplink transmission synchronization to a UE at a BS. The GP is a period between an uplink and a downlink, which eliminates uplink interference caused by multipath delay of a downlink signal. Meanwhile, one subframe includes two slots irrespective of the type of a radio frame.

The above-described radio frame structures are merely exemplary, and thus it should be noted that the number of subframes in a radio frame, the number of slots in a subframe, or the number of symbols in a slot may vary.

Figure 3:
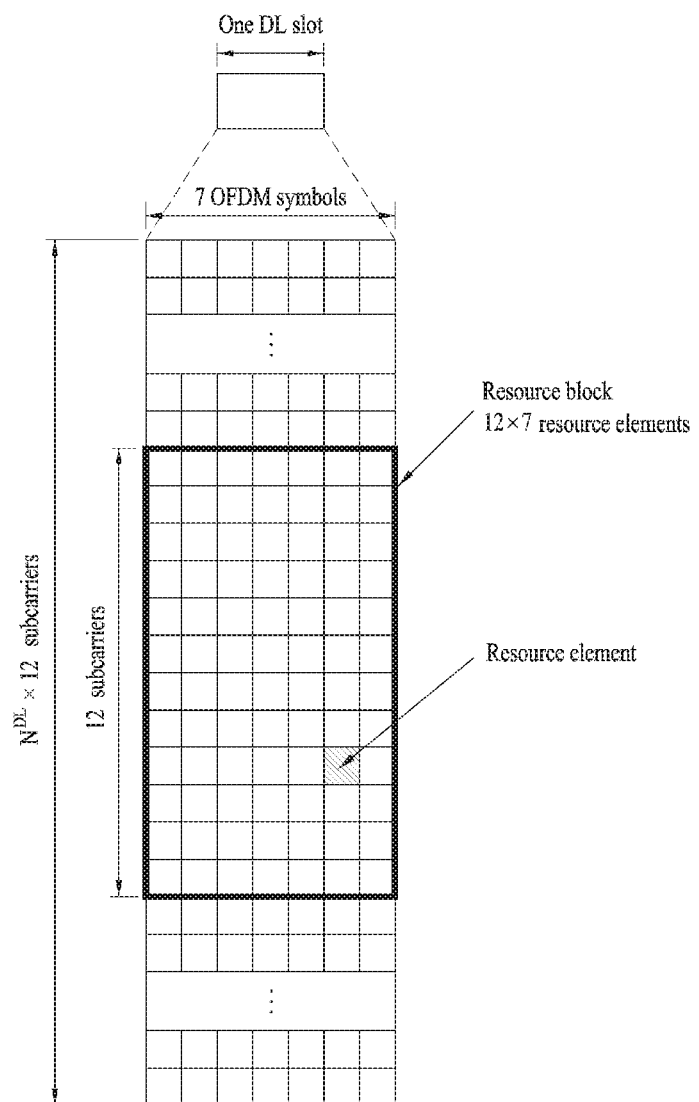
FIG. 3 is a diagram illustrating a resource grid for a downlink slot.

FIG. 3 is a diagram illustrating a resource grid for a downlink slot.

A downlink slot includes 7 OFDM symbols in the time domain, and an RB includes 12 subcarriers in the frequency domain, which does not limit the scope and spirit of the present invention. For example, a downlink slot may include 7 OFDM symbols in the case of the normal CP, whereas a downlink slot may include 6 OFDM symbols in the case of the extended CP. Each element of the resource grid is referred to as a Resource Element (RE). An RB includes 12×7 REs. The number of RBs in a downlink slot, NDL depends on a downlink transmission bandwidth. An uplink slot may have the same structure as a downlink slot.

Figure 4:
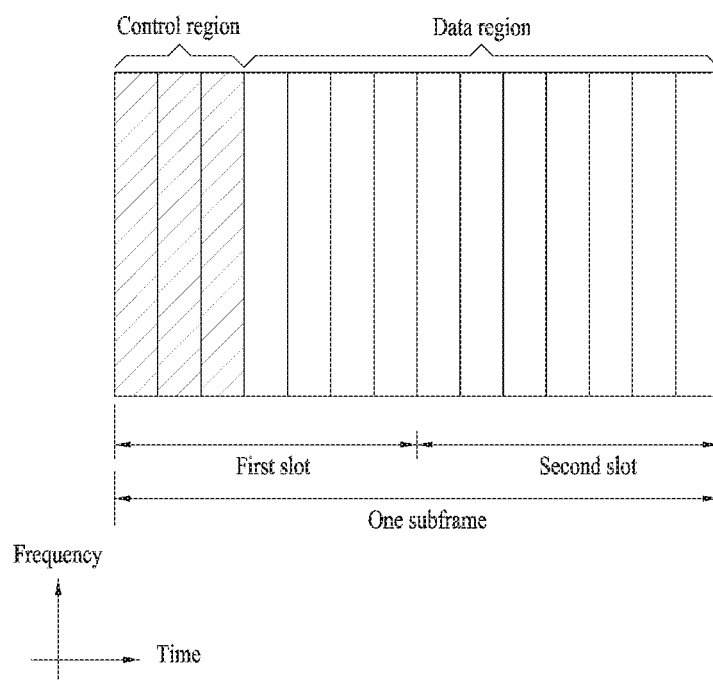
FIG. 4 is a diagram illustrating the structure of a downlink subframe.

FIG. 4 is a diagram illustrating a downlink subframe structure.

A maximum of three OFDM symbols located in a front portion of the first slot in a downlink subframe corresponds to a control region to which control channels are allocated, and the remaining OFDM symbols of the downlink subframe corresponds to a data region to which a PDSCH is allocated.

Examples of downlink control channels used in the 3GPP LTE system include a Physical Control Format Indicator CHannel (PCFICH), a Physical Downlink Control CHannel (PDCCH), and a Physical Hybrid automatic repeat request (HARQ) Indicator CHannel (PHICH). The PCFICH is transmitted in the first OFDM symbol of a subframe and carries information on the number of OFDM symbols used for transmission of control channels in the subframe. The PHICH carries an HARQ ACKnowledgment/Negative ACKnowledgment (ACK/NACK) signal in response to uplink transmission. Control information carried on the PDCCH is called Downlink Control Information (DCI). The DCI includes uplink or downlink scheduling information or uplink transmission power control commands for UE groups. The PDCCH carries information on resource allocation and a transport format for a Downlink Shared CHannel (DL-SCH), resource allocation information on an Uplink Shared CHannel (UL-SCH), paging information of a Paging CHannel (PCH), system information on the DL-SCH, information about resource allocation for a higher-layer control message such as a Random Access Response transmitted on the PDSCH, a set of transmission power control commands for individual UEs of a UE group, transmission power control information, Voice Over Internet Protocol (VoIP) activation information, etc. A plurality of PDCCHs may be transmitted in the control region, and a UE may monitor a plurality of PDCCHs.

The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups. A format of the PDCCH and the number of bits of the available PDCCH are determined according to correlation between the number of CCEs and the coding rate provided by the CCEs.

A BS determines the PDCCH format according to DCI transmitted to a UE and adds a Cyclic Redundancy Check (CRC) to control information. The CRC is masked by an Identifier (ID) known as a Radio Network Temporary Identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a Paging Indicator Identifier (P-RNTI). If the PDCCH carries system information (particularly, a System Information Block (SIB)), its CRC may be masked by a system information ID and a System Information RNTI (SI-RNTI). To indicate that the PDCCH carries a random access response in response to a random access preamble transmitted by a UE, its CRC may be masked by a Random Access-RNTI (RA-RNTI).

Figure 5:
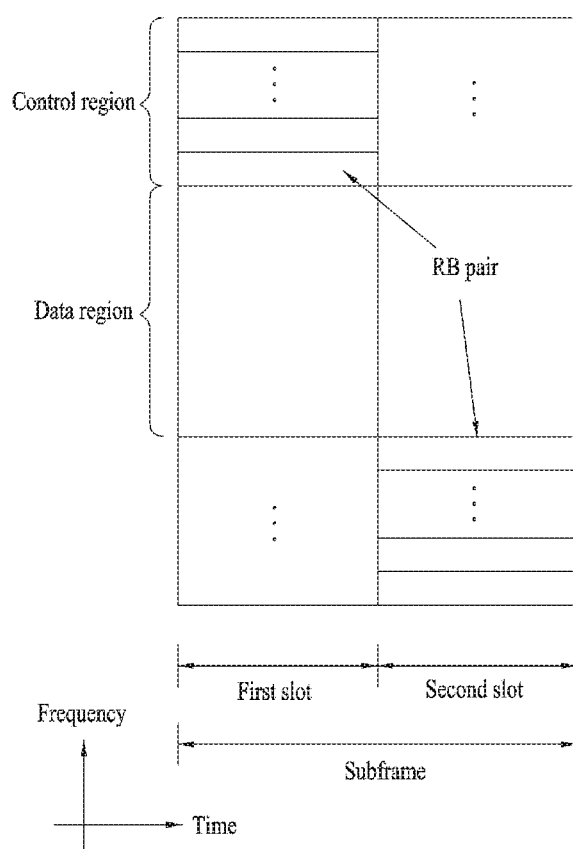
FIG. 5 is a diagram illustrating the structure of an uplink subframe.

FIG. 5 is a diagram illustrating an uplink subframe structure.

An uplink subframe may be divided into a control region and a data region in the frequency domain. A Physical Uplink Control CHannel (PUCCH) carrying uplink control information is allocated to the control region, and a Physical Uplink Shared Channel (PUSCH) carrying user data is allocated to the data region. To maintain the property of a single carrier, a UE does not simultaneously transmit a PUSCH and a PUCCH. A PUCCH for a UE is allocated to an RB pair in a subframe. The RBs of the RB pair occupy different subcarriers in two slots. Thus, it is said that the RB pair allocated to the PUCCH is frequency-hopped over a slot boundary.

Modeling of Multiple Input Multiple Output (MIMO) System

Figure 6:
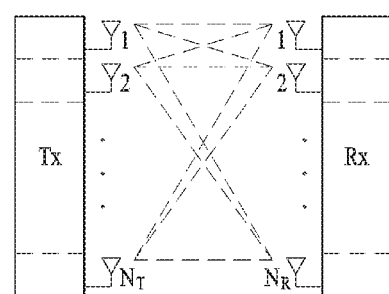
FIG. 6 is a diagram illustrating a configuration of a wireless communication system having multiple antennas.
Figure 6:
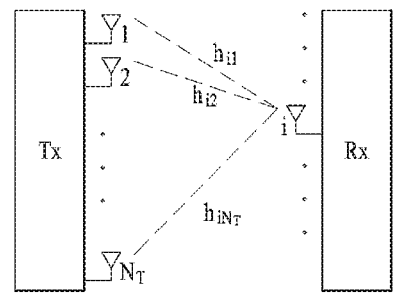

FIG. 6 is a diagram illustrating a configuration of a wireless communication system having multiple antennas.

Referring to FIG. 6(a), when the number of Transmission (Tx) antennas and the number of Reception (Rx) antennas are increased to NT and NR, respectively at both a transmitter and a receiver, a theoretical channel transmission capacity increases in proportion to the number of antennas, compared to use of a plurality of antennas at only one of the transmitter and the receiver. Therefore, transmission rate and frequency efficiency are remarkably increased. Along with the increase of channel transmission capacity, the transmission rate may be increased in theory to the product of a maximum transmission rate Ro that may be achieved in case of a single antenna and a rate increase rate Ri.

$$R_i = \min(N_T, N_R) \quad \text{[Equation 1]}$$

For instance, assuming that a MIMO communication system uses 4 Tx antennas and 4 Rx antennas, the MIMO system can theoretically acquire a high transfer rate which is four times higher than that of a single antenna system. After this theoretical capacity increase of the MIMO system has been proved in the middle of 90's, many ongoing efforts are made to various techniques to substantially improve a data transmission rate. Some of the above technologies have been reflected in a variety of wireless communication standards, for example, third-generation mobile communication or next-generation wireless LAN, etc.

The trends for the MIMO relevant studies are as follows. First, many ongoing efforts are made in various aspects to develop and research information theory study relevant to MIMO communication capacity calculations in various channel configurations and multiple access environments, radio channel measurement and model derivation study for MIMO systems, spatiotemporal signal processing technique study for transmission reliability enhancement and transmission rate improvement, etc.

Figure 7:
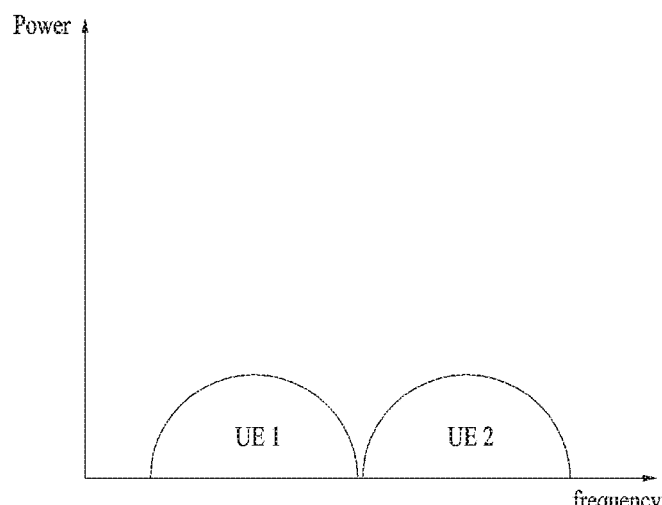
FIG. 7 is a diagram illustrating a method for allocating resources based on a NOMA scheme.
Figure 7:
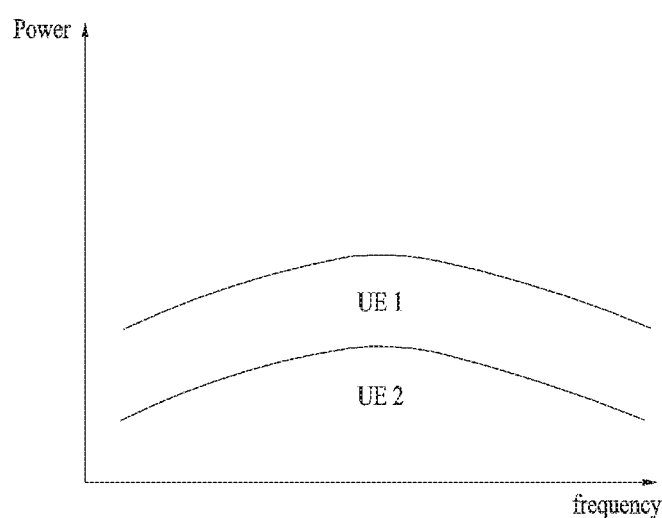

Communication in the MIMO system will be described in detail through mathematical modeling. It is assumed that there are NT Tx antennas and NR Rx antennas as illustrated in FIG. 7. Since up to NT pieces of information can be transmitted through the NT Tx antennas, a transmission signal can be expressed as a vector in Equation 2.

$$s = [s_1, s_2, \ldots, s_{N_T}]^T \quad \text{[Equation 2]}$$

Meanwhile, a different transmit power may be applied to each piece of transmission information, $S_1, S_2, \ldots, S_{N_T}$. If transmit powers are set to $P_1, P_2, \ldots, P_{N_T}$, respectively, the transmission information with adjusted transmit powers can be represented as a vector in Equation 3.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T, \quad \text{[Equation 3]}$$

In addition, $\hat{s}$ can be expressed as shown in Equation 4 using a diagonal matrix P of the transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

Assuming that $N_T$ transmitted signals $x_1, x_2, \ldots, x_T$, which will be actually transmitted, are configured by applying a weight matrix W to the information vector $\hat{s}$ having the adjusted transmit powers, the weight matrix serves to appropriately distribute the transmission information to each antenna according to a transport channel state. The transmitted signals, $x_1, x_2, \ldots, x_T$ can be expressed as shown in Equation 5 using a vector X.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \vdots \\ w_{i1} & w_{i2} & \cdots & w_{iN_T} \\ \vdots & & \ddots & \vdots \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_i \\ \vdots \\ \hat{s}_{N_T} \end{bmatrix} = W\hat{s} = WPs$$ [Equation 5]

In Equation 5, $W_{ij}$ denotes a weight between an $i^{th}$ Tx antenna and $j^{th}$ information, and W is also called a precoding matrix.

If the NR Rx antennas are present, respective received signals $y_1, y_2, \ldots, y_{N_R}$ of the antennas can be expressed as follows.

$$y = [y_1, y_2, \ldots, y_{N_R}]^T$$ [Equation 6]

If channels are modeled in the MIMO wireless communication system, the channels may be distinguished according to Tx/Rx antenna indexes. A channel from the Tx antenna j to the Rx antenna i is denoted by $h_{ij}$. In $h_{ij}$, it is noted that the indexes of the Rx antennas precede the indexes of the Tx antennas in view of the order of indexes.

FIG. 6(b) is a diagram illustrating channels from the NT Tx antennas to the Rx antenna i. The channels may be combined and expressed in the form of a vector and a matrix. In FIG. 6(b), the channels from the NT Tx antennas to the Rx antenna i can be expressed as follows.

$$h_i^T = [h_{i1}, h_{i2}, \ldots, h_{iN_T}]$$ [Equation 7]

Accordingly, all channels from the NT Tx antennas to the NR Rx antennas can be expressed as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R 1} & h_{N_R 2} & \cdots & h_{N_R N_T} \end{bmatrix}$$ [Equation 8]

An AWGN (Additive White Gaussian Noise) is added to the actual channels after a channel matrix H. The AWGN $n_1, n_2, \ldots, n_{N_R}$ respectively added to the NR receive antennas can be expressed as follows.

$$n = [n_1, n_2, \ldots, n_{N_R}]^T$$ [Equation 9]

Through the above-described mathematical modeling, the received signals can be expressed as follows.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R 1} & h_{N_R 2} & \cdots & h_{N_R N_T} \end{bmatrix}$$ [Equation 10]

$$\begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = Hx + n$$

Meanwhile, the number of rows and columns of the channel matrix H indicating the channel state is determined by the number of Tx and Rx antennas. The number of rows of the channel matrix H is equal to the number NR of Rx antennas, and the number of columns thereof is equal to the number NR of Tx antennas. That is, the channel matrix H is an NR×NT matrix.

The rank of the matrix is defined by the smaller of the number of rows and the number of columns, which are independent from each other. Accordingly, the rank of the matrix is not greater than the number of rows or columns. The rank (rank(H)) of the channel matrix H is restricted as follows.

$$\text{rank}(H) \leq \min(N_T, N_R)$$ [Equation 11]

Additionally, the rank of a matrix can also be defined as the number of non-zero Eigen values when the matrix is Eigen-value-decomposed. Similarly, the rank of a matrix can be defined as the number of non-zero singular values when the matrix is singular-value-decomposed. Accordingly, the physical meaning of the rank of a channel matrix can be the maximum number of channels through which different pieces of information can be transmitted.

In this specification, 'rank' in the MIMO transmission represents the number of paths through which signals can be independently transmitted on a specific frequency resource at a specific time and 'the number of layers' refers to the number of signal streams transmitted through each path. Since a transmitter transmits as many layers as the number of ranks used for signal transmission, the rank corresponds to the number of layers unless otherwise mentioned.

FIG. 7 is a diagram illustrating a method for allocating resources based on a NOMA scheme.

In the cellular system, a BS may use multiple antennas to improve the frequency efficiency as described above. To this end, a technology of increasing the number of antennas used by the BS has been proposed. This technology is called massive MIMO. According to the technology, since sharp beams are transmitted to multiple users based on spatial degrees of freedom obtained from the multiple antennas, high reception power and low interference power can be provided. For example, when the number of Tx antennas and the number of users are M and K, respectively and when a channel is independent identically distributed (i.i.d.) Rayleigh fading, total available transmission capacity can be expressed as min{M,K}log 2 SNR. That is, the transmission capacity can be linearly increased in proportion to the value of min{M,K}.

However, when values of M and K increase, a complicate transmission and reception scheme is required to obtain corresponding transmission capacity. For example, when the values of M and K increase, the BS needs to use dirty-paper coding (DPC) for downlink transmission and a joint maximum-likelihood (JML) receiver for transmission link reception to obtain the transmission capacity. In addition, the calculation complexity of these two schemes may be exponentially increased in accordance with the number of antennas and the number of users. That is, in this case, the system may not operate due to hardware complexity limitation, delay time limitation, hardware power limitation, and the like resulting from the calculation complexity.

Therefore, a sub-optimal transmission scheme with low calculation complexity should be used in the actual system. Examples of the sub-optimal transmission scheme include an orthogonal multiple access scheme and a non-orthogonal multiple access (NOMA) scheme.

According to the orthogonal multiple access scheme, independent resources are allocated to each user to mitigate interference between users. The orthogonal multiple access scheme can be categorized as a frequency division multiple access scheme where frequency resources are distributed to individual users, a time division multiple access scheme where time resources are distributed to individual users, and a space division multiple access scheme where space resources are distributed to individual users. This scheme has advantages in that signals form users can easily modulated and demodulated because given resources are allocated for a single user. As described above, the orthogonal multiple access scheme has been mainly used in the LTE and LTE-A systems.

However, the orthogonal multiple access scheme has low transmission capacity compared to the aforementioned DPC and JML. Thus, to increase the transmission capacity of the orthogonal multiple access scheme, zero-forcing beamforming, which is a simple beamforming method, has been used together with user scheduling. In this case, by selecting and informing users configured to prevent performance degradation caused by zero-forcing beamforming, it is possible to provide performance similar to that of the DPC. However, in this method, channel information of users should be known in advance for scheduling the users, and thus there may be a problem that resources occupied by uplink reference signals for obtaining the users' channel information are increased. In addition, user scheduling may be efficient when the number of users in a cell is greater than the number of antennas of a BS. However, in the case of the future communication system to which the massive MIMO is applied, since a BS has a number of antennas, the effect of scheduling may be inadequate.

Meanwhile, the non-orthogonal multiple access (NOMA) scheme can be applied as an alternative of the conventional orthogonal multiple access scheme.

Referring to FIGS. 7(a) and (b), FIG. 7(a) shows an example based on the orthogonal multiple access scheme, and FIG. 7(b) shows an example based on the NOMA scheme. Specifically, the orthogonal multiple access scheme is the scheme for allocating independent resources to each user to mitigate interference between users as described above. Unlike the orthogonal multiple access scheme, the NOMA scheme may be a scheme in which the same frequency-time resources corresponding to as a specific resource region are allocated to a plurality of users and in addition to that, interference is cancelled using an interference cancellation receiver with a predetermined power ratio. That is, it is expected that the NOMA scheme will be widely used because a wide bandwidth can be obtained.

Hereinafter, a description will be given of a method for transmitting and receiving signals by considering types of UEs based on the NOMA scheme.

Figure 8:
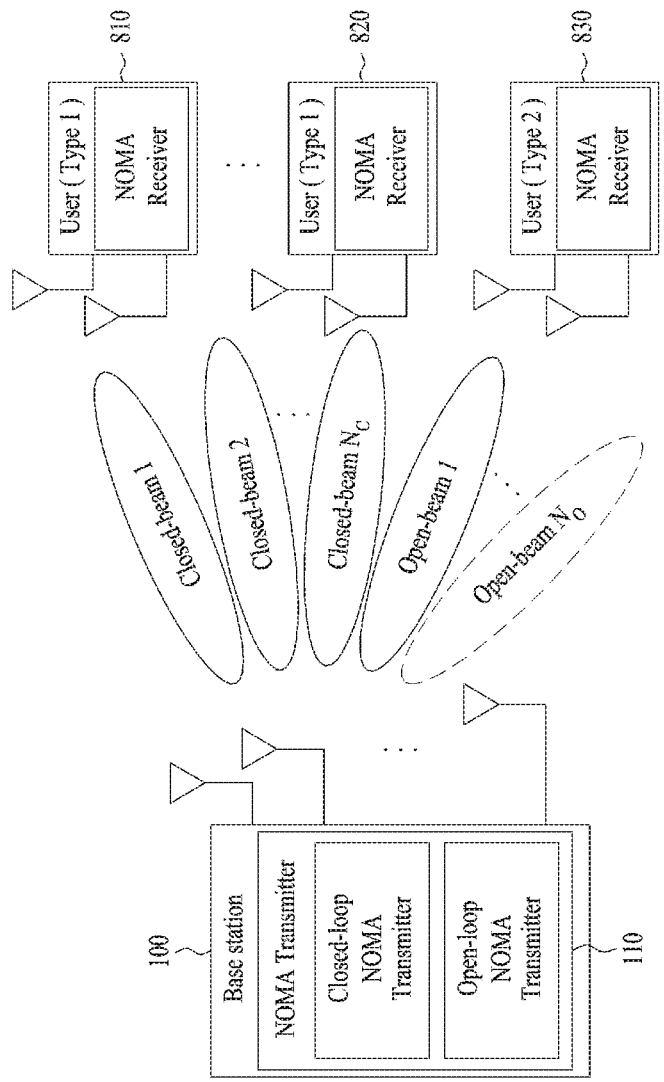
FIG. 8 is a diagram illustrating a method for generating beams according to types of user equipments.

FIG. 8 is a diagram illustrating a method for generating beams according to types of user equipments.

As described above, a wide bandwidth can be used in the NOMA scheme, and a BS can simultaneously transmit signals to a plurality of UEs (or users) using multiple antennas.

In this case, for example, the plurality of UEs can provide various services according to their types. For instance, in recent years, the Internet of Things (IoT) has been widely used. That is, communication between things or communication between a BS and things has been widely used. The communication between a BS and things may have characteristics different from those of the conventional voice communication or data communication. For example, in the case of the conventional voice communication or data communication, communication should have been performed on the basis of an irregular pattern in accordance with needs of a user using a UE. However, in the case of the communication between a BS and things, its main purpose is information sharing. Thus, only periodic data transmission is required, and the amount of transmitted data is also relatively low. In addition, even when communication fails, the communication can be performed in the next period and it does not cause a serious problem. For example, communication may be performed between a BS and things such as a sensor configured to report weather information. In this case, a change in the weather may be reported at a prescribed interval, and only information with low data may be transmitted according to a predetermined pattern or rule.

In other words, the communication between a BS and things may have characteristics different from those of the conventional voice communication or data communication.

As the use of the IoT increases, a BS needs to simultaneously communicate with things and UEs and a controlling method therefor is also required.

However, the conventional communication system may have limitations in controlling the above-described environment.

In detail, the conventional downlink multi-user transmission scheme may be a closed-loop transmission scheme where channel information should be received (i.e., frequency division duplex (FDD)) or channel estimation should be performed (i.e., time division duplex (TDD)). Thus, in the case of an IoT service where a user requires a low transmission rate, unnecessary feedback overhead or pilot overhead may be significantly increased. Hence, considering characteristics of the IoT service, an open-loop multi-user transmission scheme, which is different from the conventional one, needs to be developed for the communication between a BS and things.

In addition, in the legacy LTE system, resources are allocated to a user on a resource block (RB) basis. If this is applied to the IoT that requires a low transmission rate, most resources can be used inefficiently. This is because when resources are allocated to a user on a small unit basis, high signaling overhead may occur. Therefore, when a user requires a low transmission rate, resources need to be allocated to the user based on a new method.

Moreover, as described above, information generated by things has periodicity or it is expectable. Unlike communication with users where communication occurs randomly, communication with things can be performed based on predetermined rules, that is, communication time and transmission amount may be determined in advance. However, the conventional communication system does not support the communication method in which the IoT characteristics are reflected.

Thus, in the following description, a communication method that reflects an environment in which the communication with things and the communication with users coexist will be disclosed. In addition, a UE requiring irregular communication such as a user's terminal is referred to as a first-type UE or human-type UE, and a UE requiring regular communication and low data capacity such as a machine is referred to as a second-type UE or machine-type UE.

When the multi-antenna system is applied, multiple ranks can be applied as described above. In this case, for example, in the closed-loop transmission and reception scheme of the multi-antenna system, there may be unused ranks due to insufficient channel information or remaining ranks due to other reasons. In this case, for example, by using the unused or remaining ranks, transmission may be performed through superposition according to an open-loop transmission and reception scheme. Specifically, according to the closed-loop transmission and reception scheme, after a reference signal is transmitted to a UE, signal transmission and reception is performed based on channel estimation information, which is received based on the reference signal. In this case, since the channel estimation information is used, transmission and reception reliability can be improved. On the other hand, in the case of the open-loop transmission and reception scheme, since signals are transmitted and received without channel estimation information, transmission and reception reliability may be degraded.

Therefore, the system can support the first-type UE (or human-type UE) that guarantees a high transmission rate using instant channel information based on the closed-loop transmission and reception scheme and also support the second-type UE (or machine-type UE) that receives data at a low transmission rate using second channel information based on the open-loop transmission and reception scheme. That is, the system can be configured to simultaneously support both the first type UE and second type UE.

Specifically, referring to FIG. 8, a cellular system using multiple antennas (e.g., 3GPP LTE and LTE-A systems) may include a base station (BS) or eNodeB (eNB) 100 connected to an infrastructure and users or user equipments (UEs) 810, 820, and 830 that dispersively exist.

In this case, the BS 100 and the plurality of UEs 810, 820, and 830 may have multiple antennas as described above.

For example, the BS 100 may have N antennas, and the UEs 810, 820, and 830 may have M antennas, where N and M are plural numbers and they are not limited to specific numbers.

In addition, for example, the above-mentioned antenna may mean not only a physical antenna but also a logical antenna. That is, the antenna may mean the number of paths capable of performing transmission or reception, which are controlled by a baseband processor of the BS 100 or each of the UEs 810, 820, and 830. In addition, even when the number of physical antenna units such as a hybrid array antenna is different from the number of paths that can be controlled by a baseband processor, the following configurations can be applied. However, for convenience of description, the present invention is described on the assumption that they are equal to each other.

Referring to FIG. 8, a transmitter of the BS 100 may include a closed-loop NOMA transmitter 111 in charge of closed-loop transmission and an open-loop NOMA transmitter 112 in charge of open-loop transmission. In this case, the closed-loop NOMA transmitter 111 may create closed-loop beams based on instant channel information of users, that is, beams to be transmitted to the first-type UEs. In this case, the number of generated beams is Nc, where Nc may be equal to or lower than the total number of antennas, N.

For example, when the number of users who know the instant channel information is lower than N, when the number of users who know the instant channel information is higher than N but a channel rank is lower than N, or when the number of users who know the instant channel information is higher than N but it is more beneficial to perform transmission for users less than N, Nc may be set to be lower than N. However, the above-described cases are merely examples, the invention is not limited thereto. That is, Nc can be applied when it is equal to or lower than N.

The open-loop NOMA transmitter 112 may create open-loop beams using statistical characteristics of users' channels. In this case, the closed-loop beam can be referred to as a first-type beam, and the open-loop beam can be referred to as a second-type beam. In this case, for example, after generation of the closed-loop beams, the open-loop beams may be generated based on the generated closed-loop beams. In this case, since the rank of the space spanned by the BS 100 for the closed-loop beams may be Nc, the rank of the null space of the closed-loop beams according to the null-rank theorem may be (N−Nc). No beams corresponding to the open-loop beams may be created in the space of (N−Nc).

In detail, as described above, the rank of the space spanned for the closed-loop beams may be Nc. In this case, the Nc closed-loop beams can be expressed as $f_1, f_2, \ldots, f_{N_C}$. In this case, $f_i$ may be an N×1 vector. Thus, the space spanned by $f_1, f_2, \ldots, f_{N_C}$ may be spanned as an Nc-dimensional subspace over N dimensions. In this case, the null space for the spanned Nc-dimensional subspace may occupy an (N−Nc)-dimensional subspace over N dimensions. In this case, the above-mentioned open-loop beams may be created in the (N−Nc)-dimensional subspace. That is, the N0 open-loop beams may be created in the (N−Nc)-dimensional subspace. At this time, the open-loop NOMA transmitter 112 may transmit information to users using the above-described null space. In other words, the open-loop NOMA transmitter 112 transmits information to users through the No space using the open-loop beams. In this case, for example, the open-loop beams may be created using the users' channels statistical characteristics, which will be described in detail later.

In addition, for example, the value of No may be equal to or lower than that of (N−Nc). For instance, since the space for the closed-loop beams is first generated and then the space for the open-loop beams is generated using the remaining channel rank, which is unused due to insufficient channel information resulting from the space for the closed-loop beams or other reasons, No may be lower than (N−Nc). That is, the No space may be generated up to the (N−Nc)-dimensional subspace but the present invention is not limited thereto.

Moreover, for example, each of the UEs 810, 820, and 830 can receive a signal transmitted from the BS 100 through a receiver. In this case, for instance, the receiver may include a NOMA receiver. That is, each of the UEs 810, 820, and 830 can receive the signal transmitted from the BS 100 through the NOMA receiver. In this case, each of the UEs 810, 820, and 830 can know in advance whether to receive the signal through a closed-loop beam or open-loop beam. In this case, the first-type UE can receive the closed-loop beam, and the second-type UE can receive the open-loop beam.

That is, the BS 100 can transmit beams to first-type and second-type UEs in one resource region based on the NOMA scheme. In this case, the BS 100 may first create closed-loop beams for first-type UEs and then create and allocate open-loop beams in the remaining space by considering the null space of the generated closed-loop.

Figure 9:
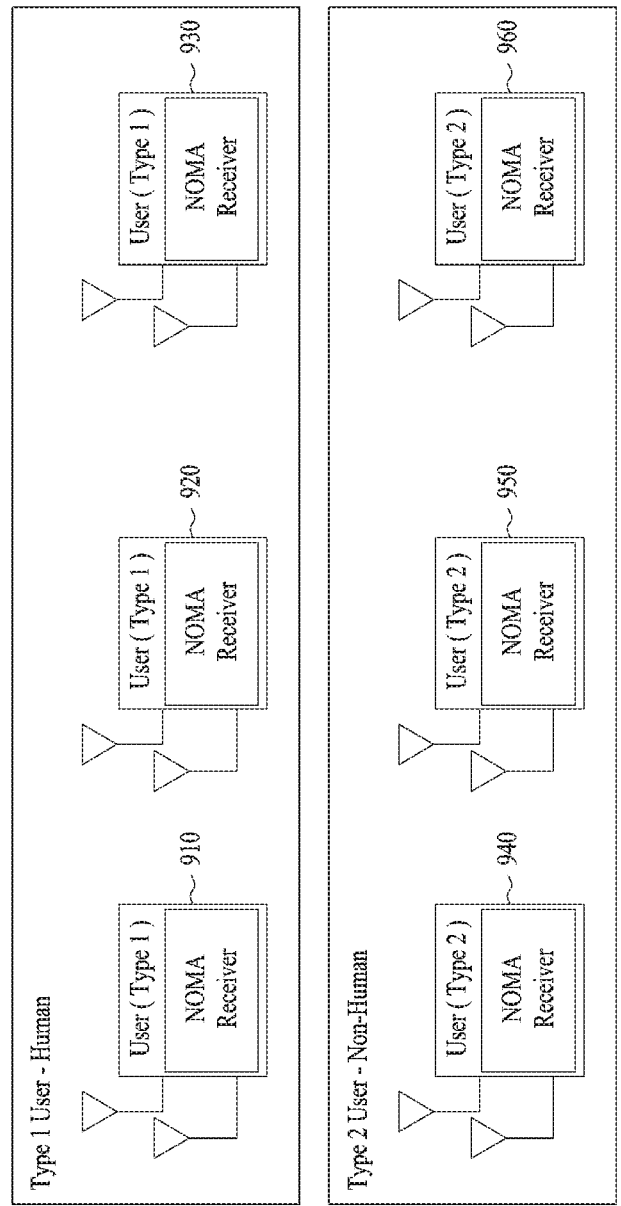
FIG. 9 is a diagram illustrating classification of user equipments into two types.

FIG. 9 is a diagram illustrating classification of UEs into two types.

Referring to FIG. 9, as described above, UEs can be divided into first-type (human-type) UEs 910, 920, and 930 and second-type (machine-type) UEs 940, 950, and 960.

In this case, for example, each of the UEs 910, 920, 930, 940, 950, and 960 can inform the BS 100 of its type. For instance, each of the UEs 910, 920, 930, 940, 950, and 960 can define a type-related field in a physical uplink shared channel (PUSCH) when accessing a cell and then provide information on its type to the BS 100 through the type-related field. In addition, for instance, the BS 100 may track and analyze a Quality of Service (QoS) indicator of each of the UEs 910, 920, 930, 940, 950, and 960 to obtain each UE's type.

Moreover, for instance, the BS 100 may have list information on a list of first-type UEs and a list of second-type UEs. The BS 100 may use different transmission schemes using the list information. That is, information on types of the plurality of UEs 910, 920, 930, 940, 950, and 960 may be reported to the BS 100 or determined in advance, but the present invention is not limited thereto.

Figure 10:
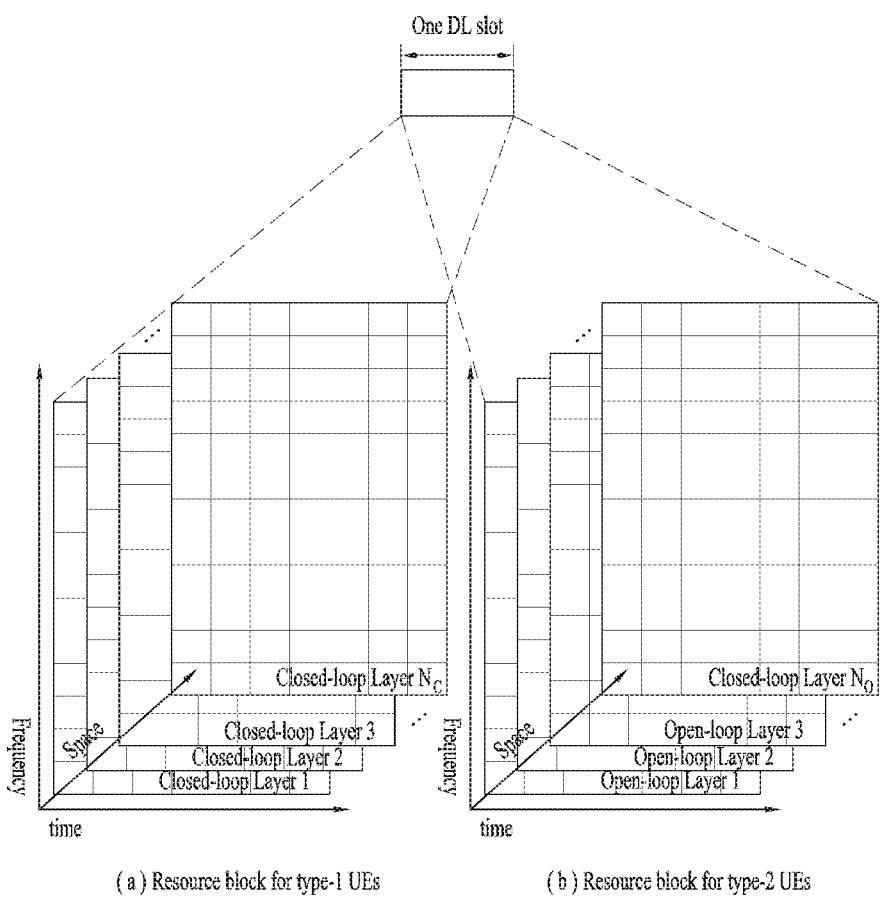
FIG. 10 is a diagram illustrating resource blocks (RBs) for two types of user equipments.

FIG. 10 is a diagram illustrating RBs for two types of UEs.

Specifically, FIG. 10 shows an example of a resource grid of one RB used in the LTE system. The OFDM symbol shown in FIG. 10 is configured with the normal CP. In this case, as described above, a downlink slot includes a plurality of OFDM symbols in the time domain and a multitude of RBs in the frequency domain.

In addition, the number of included layers may be equal to the number of antennas of the BS. Here, although it is assumed that one downlink slot includes 7 OFDM symbols and one RB includes 12 subcarriers, the invention is not limited thereto.

Referring to FIG. 10, RBs of the BS may be divided into closed-loop layers as resources for first-type UEs and open-loop layers as resources for second-type UEs.

That is, in one resource region, closed-loop and open-loop beams may be allocated together based on the NOMA scheme. In this case, the resource region may be divided into a space for the closed-loop beams and a space for the open-loop beams in consideration of a multi-antenna environment. In this case, Nc closed-loop layers may be included in the space for the closed-loop beams. Here, Nc may be equal to the aforementioned number of closed-loop beams. In other words, the number of closed-loop layers may be equal to the aforementioned number of closed-loop beams.

In the same way, No open-loop layers may be included in the space for the open-loop beams. Here, No may be equal to the aforementioned number of open-loop beams. In other words, the number of open-loop layers may be equal to the aforementioned number of open-loop beams.

In addition, the beams and layers may be in a one-to-one correspondence. In this case, for example, resource allocation for the closed-loop beams may be first performed, and then resource allocation for the open-loop beams may be performed by considering the resource allocation for the closed-loop beams. That is, the space for the closed-loop beams may be first configured, and then the space for the open-loop beams may be configured.

Figure 11:
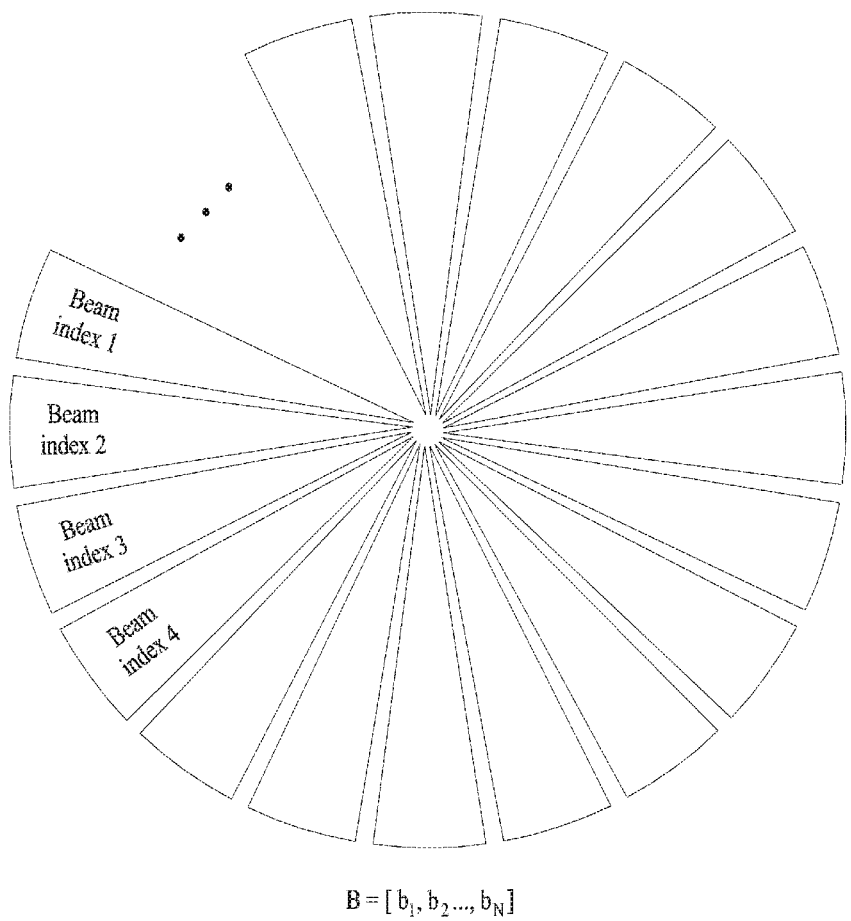
FIG. 11 is a diagram illustrating an open-loop beam codebook.

FIG. 11 is a diagram illustrating an open-loop beam codebook.

Hereinafter, a description will be given of a method for dividing open-loop beams in a space for the open-loop beams.

Figure 12:
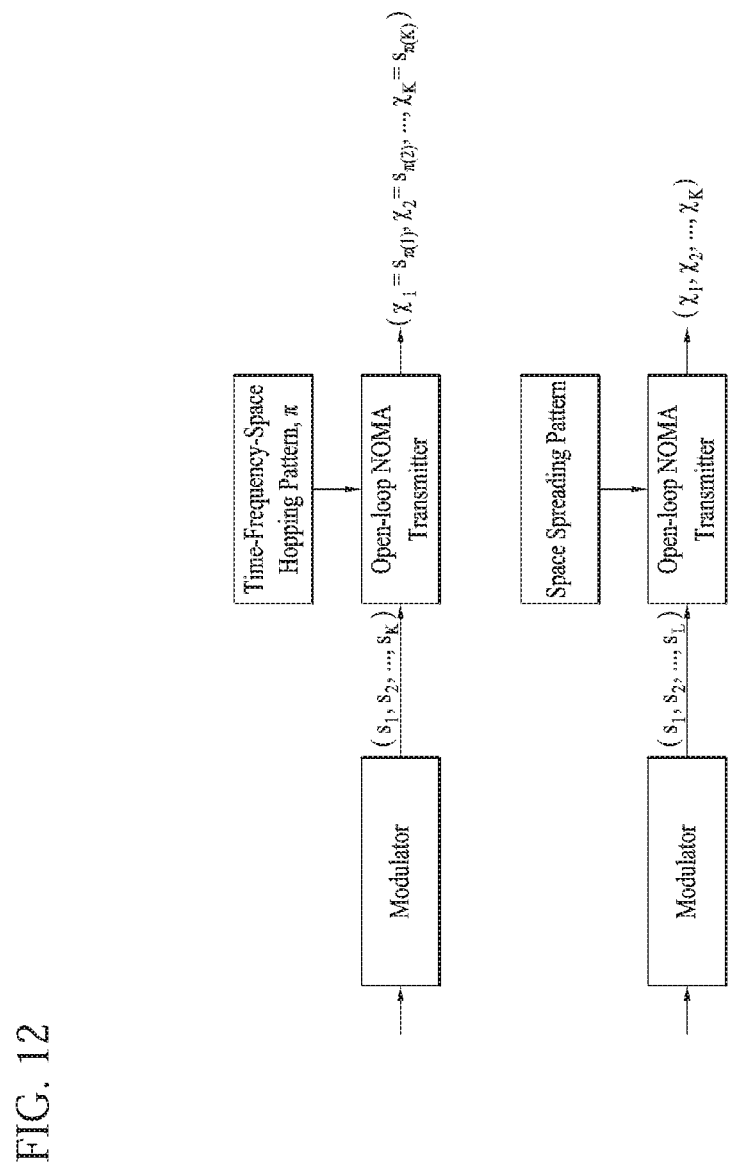
FIG. 12 is a diagram illustrating an open-loop beam selection method.

As described above, a space for closed-loop beams may be first configured, and then a space for open-loop beams may be configured. In this case, No open-loop beams may be included in the space for the open-loop beams. In addition, a BS can divide the individual beams for second-type UEs using a beam codebook. In this case, for example, the beam codebook may be based on discrete Fourier transform (DFT) as shown in FIG. 12.

$$B = \frac{1}{\sqrt{N}} \begin{bmatrix} 1 & 1 & \cdots & 1 \\ 1 & \omega & \cdots & \omega^{(N-1)} \\ \vdots & \vdots & \ddots & \vdots \\ 1 & \omega^{N-1} & \cdots & \omega^{(N-1)(N-1)} \end{bmatrix}$$ [Equation 12]

In Equation 12, the equation of $\omega=\exp(-2\pi i/N)$ may be satisfied. Here, an $i^{th}$ beam corresponding to a vector set composed of vectors closest to an $i^{th}$ column vector $b_i$ of B can be defined as shown in Equation 13.

$$B_i = \{x \in \square^N | |b_i^H x|^2 \leq |b_j^H x|^2, \forall j \neq i\}$$ [Equation 13]

In addition, a channel of second-type UE A can be defined as shown in Equation 14.

$$h_A = R_A^{1/2} w_A$$ [Equation 14]

In Equation 14, $w_A \in \square^n$ may mean small-scale (or short-term) fading, which is changed every coherence time. In addition, $R_A \in \square^{N \times N}$ may mean large-scale (or long-term) fading in addition to spatial correlation among the BS and second-type UEs, where second-order statistical characteristics of the channel may satisfy the equation of $R_A = E[h_A h_A^H]$. In this case, the BS may distinguish the second-type UEs using $R_A$, which indicates second-order channel characteristics of the second-type UEs. When eigenvalue decomposition is performed on the second-order channel characteristics of the second-type UEs, it can be expressed as shown in Equation 15.

$$R_A = U_A D_A U_A^H$$ [Equation 15]

In Equation 15, $U_A = [u_{A,1}, u_{A,2}, \ldots, u_{A,N}]$ is an N×N unitary matrix. In addition, $D^A$ is an N×N diagonal matrix, where an $i^{th}$ diagonal component has an eigenvalue of $\lambda_i$ and $\lambda_i \geq \lambda_{i+1}$.

When the above-described conditions are satisfied, a space spanned by an $i^{th}$ eigenvector, $u_{A,i}$ belongs to $B_j$, and it can be expressed as shown in Equation 16.

Condition: $u_{A,i} \in B_j$ [Equation 16]

Hence, it is possible to determine which beam each of the second-type UEs corresponds to according to its second-order channel characteristics. In addition, it is a matter of course that only when an eigenvalue is equal to or higher than a predetermined value, an eigenvector corresponding to the eigenvalue is meaningful. That is, it can be expressed as shown in Equation 17.

$$L_A = (\chi_{A,1}, \chi_{A,2}, \ldots, \chi_{A,\tilde{N}})$$ [Equation 17]

In Equation 17, $\tilde{N}$ denotes the number of meaningful eigenvectors. That is, the channel of the second-type UE A can be approximated as a channel spanned as $b_{\chi_{A,1}}$, $b_{\chi_{A,2}}, \ldots, b_{\chi_{A,\tilde{N}}}$. Moreover, an open-loop beam for each second-type UE may be configured in the open-loop beam space based on the second-order channel characteristics. For example, as an open-loop beam, the aforementioned approximated channel of the second-type UE A, $b_{\chi_4,1}$, $b_{\chi_4,2}, \ldots, b_{\chi_4,N}$ can be calculated through projection onto the null space of $f_1, f_2, \ldots, f_{N_C}$, which are closed-loop beams of the first-type UEs.

That is, after calculating the space for the closed-loop beams, the BS may allocate the open-loop beams to the calculated null space. Referring to FIG. 11, an open-loop beam index may be selected in the space for the open-loop beams. In this case, the BS may map data symbols to be transmitted through each open-loop beam to an open-loop layer corresponding to the selected index. In other words, the BS may allocate the respective open-loop beams in the space for the open-loop beams based on beam indices.

Figure 13:
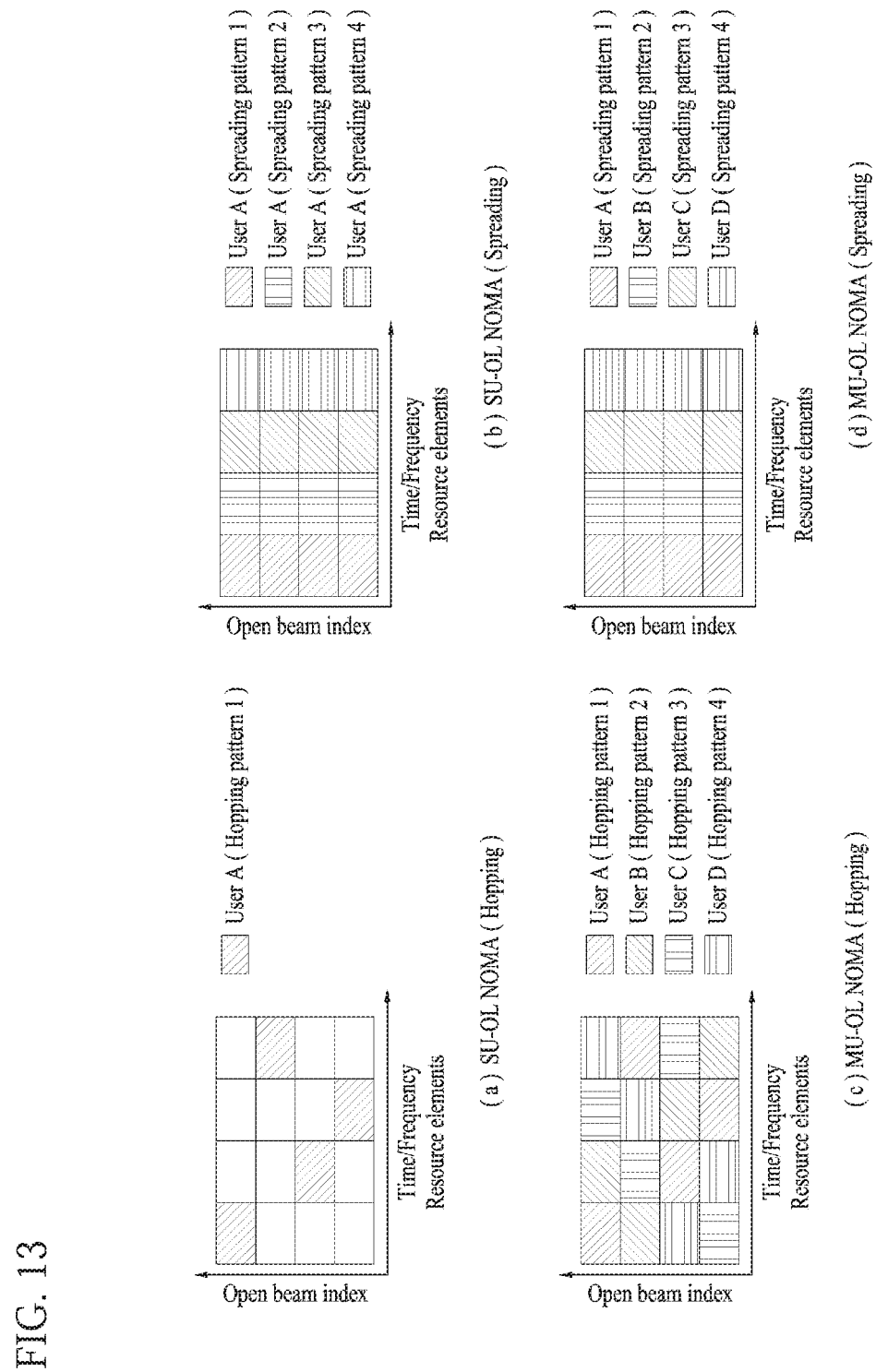
FIG. 13 is a diagram illustrating an example of the open-loop beam selection method.

FIGS. 12 and 13 are diagrams respectively illustrating an open-loop beam selection method and embodiment thereof.

As described above, an open-loop beam can be mapped to a corresponding open-loop layer based on a beam index. In this case, a BS can transmit data symbols using the corresponding open-loop layer.

In this case, for example, the data symbols for the open-loop beam can be transmitted through time-frequency-space hopping or spreading to obtain time-frequency-space diversity. In this case, for example, a hopping or spreading pattern may be determined based on the aforementioned statistical characteristics of the channel.

For example, referring to FIG. 13, when a BS transmits data symbols to a UE based on a single-user (SU) scheme, the BS may perform the transmission by configuring a hopping pattern or spreading pattern. In addition, when the BS transmits data symbols to a plurality of UEs based on a multi-user (SU) scheme, the BS may perform the transmission by configuring a hopping pattern or spreading pattern.

In detail, referring to FIG. 12, a signal allocated to an open-loop layer can be calculated using hopping and spreading schemes as described above. In this case, for example, in the closed-loop transmission and reception scheme, a modulation and coding scheme (MCS) of a signal to be transmitted may be determined by estimation of an instant channel or reception of a channel quality indicator (CQI). That is, in the case of closed-loop beams, the MCS may be determined by feedback information, and then signal transmission and reception may be performed.

On the other hand, in the open-loop transmission and reception scheme, since there is no estimated instant channel information or CQI, a predetermined MCS should be used. That is, in the case of open-loop beams, since there is no feedback information, the predetermined or predefined MCS needs to be used. In this case, the MCS may be determined according to various requirements of the network.

For example, the MCS may be determined by measuring average power of cell-specific reference signals (CS-RSs) transmitted from second-type UEs to the BS and a variance value. When the average power of the CS-RSs is $P_{RS}$ and the variance value is measured as $\sigma_{RS}^2$, it is possible to obtain a random variable of X that satisfies the average power and variance value. In addition, when the random variable X is approximated using the gamma distribution, a shape parameter of X may be determined as $k=P_{RS}/\theta$ and a scale parameter of X may be determined as $\theta=\sigma_{RS}^2/P_{RS}$. In this case, X can be distributed according to Equation 18.

$$f_X(x; k, \theta) = \frac{x^{k-1} e^{-\frac{x}{\theta}}}{\theta^k \Gamma(k)}$$ [Equation 18]

In this case, the MCS can be determined using the random variable X such that a probability of failure in decoding a signal transmitted from the BS (i.e., outage probability) is lower than a predetermined level. That is, when a received power requirement for using an $i^{th}$ MCS is $\rho_i$ and frequency efficiency is $\eta_i$, the optimal MCS can be determined according to Equation 19 below.

maximize $\eta_i$ subject to $Pr(X<\rho_i)<\Theta$ [Equation 19]

In Equation 19, $\Theta$ indicates the outage probability required by the network.

In this case, referring to FIG. 12, diversity gain can be achieved using the hopping and spreading schemes to improve received signal quality in the open-loop layer.

In this case, for example, the hopping and spreading patterns for the diversity gain may be determined at a time when the second-type UEs associate with (or access) the BS. In this case, the above-described hopping and spreading pattern may be generated in the frequency domain (i.e., subcarrier) or time domain (i.e., OFDM symbol). In the case of the second-type UEs, a new MCS of the received signal may be determined according to the above-described hopping and spreading patterns. For example, when a single data symbol is spread y times and then transmitted, its signal power may be increased as $YP_{RS}$, and thus the new MCS can be calculated.

Figure 14:
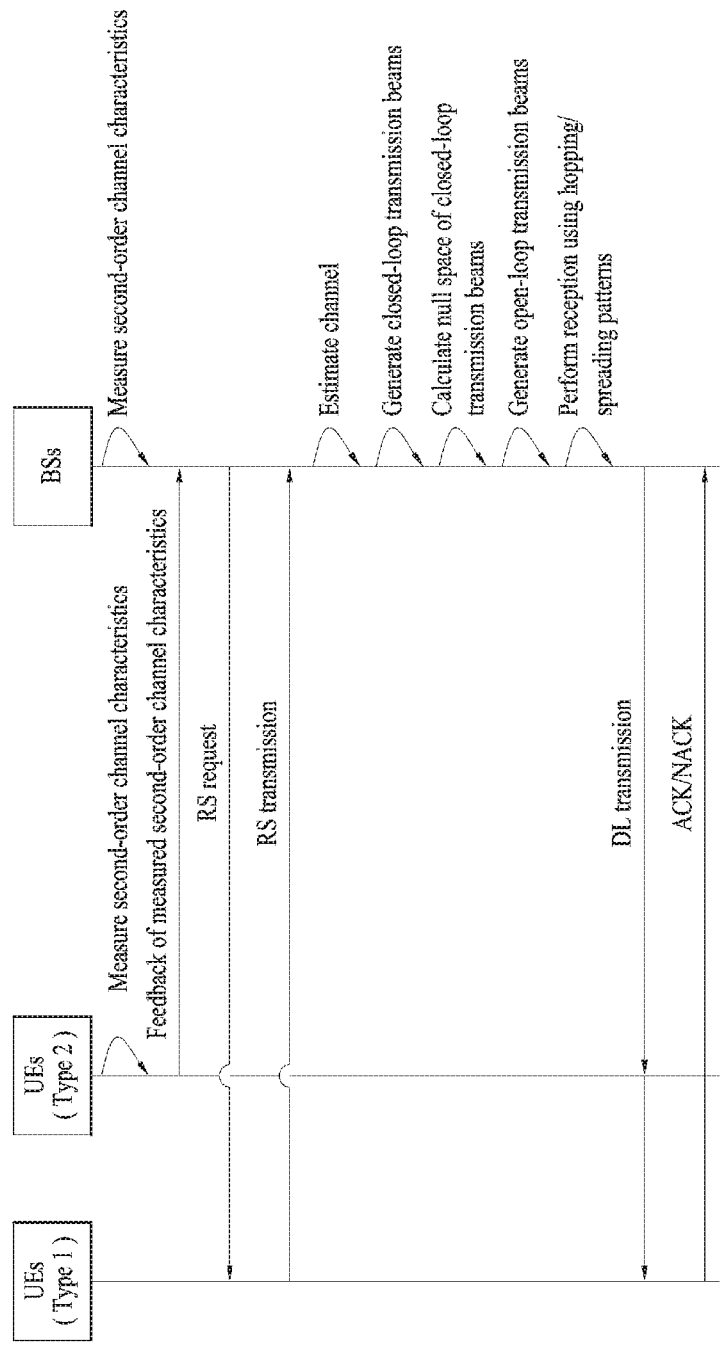
FIG. 14 is a flowchart according to an embodiment of the present invention.

FIG. 14 is a flowchart according to an embodiment of the present invention.

Referring to FIG. 14, a BS may select first-type UEs according to a scheduling algorithm. In this case, as described above, the BS may receive type information from a plurality of UEs or estimate type information from QoS. Thereafter, the BS may request uplink RSs to first-type UEs. That is, the BS may allocate RSs to the first-type UEs and obtain instant channel information based on the RSs. In this case, the BS does not allocate RSs to second-type UEs, and the BS does not obtain instant channel information related to the second-type UEs.

Thereafter, the BS may create closed-loop transmission beams based on the estimated channel information and then calculate the null space of a space for the crated closed-loop transmission beams. In addition, the BS may select open-loop beam indices corresponding to the null space. Subsequently, the BS may map data symbols to be transmitted to open-loop layers corresponding to the selected open-loop beam indices and then transmit the data symbols. In this case, the BS may use the hopping or spreading scheme as described above. Thereafter, the BS can transmit the configured closed-loop beams and open-loop beams in downlink.

Figure 15:
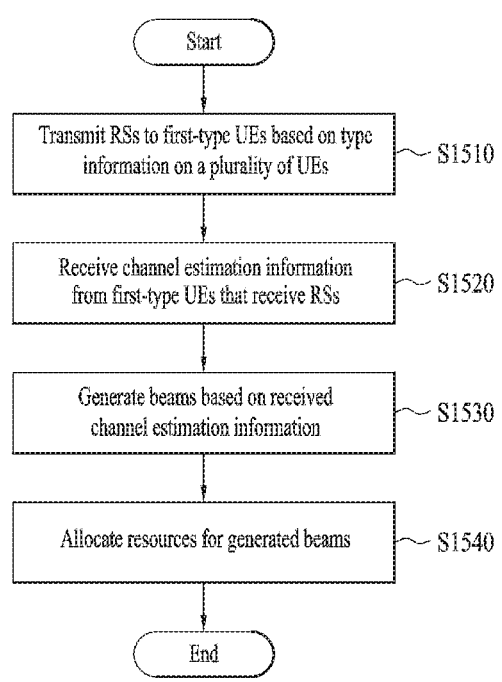
FIG. 15 is a flowchart according to an embodiment of the present invention.

FIG. 15 is a flowchart according to an embodiment of the present invention.

Referring to FIG. 15, a BS can transmit RSs to first-type UEs based on type information on a plurality of UEs [S1510]. Next, the BS can receive channel estimation information from the first-type UEs that receive the RSs [S1520]. In this case, as a human-type UE, the first-type UE may be a UE where data is irregularly transmitted, and a large amount of data is transmitted as described with reference to FIGS. 7 to 14. In addition, as a machine-type UE, the second-type UE may be a UE where data is periodically transmitted, and a small amount of data is transmitted.

Next, the BS can create beams based on the received channel estimation information [S1530] and then allocate resources for the created beams [S1540]. In this case, as described with reference to FIGS. 7 to 14, the BS may first create and allocate closed-loop beams to be transmitted to the first-type UEs using the received channel estimation information and then create and allocate open-loop beams based on the created closed-loop beams. In this case, the BS may transmit the closed-loop beams to the first-type UEs and the open-loop beams to the second-type UEs. In addition, the BS may transmit the closed-loop and open-loop beams in one resource region using the NOMA scheme as described above. In this case, the resource region may be divided into a first space including Nc closed-loop beams and a second space including No open-loop beams. Moreover, after generation of the first space, the second space may be generated by considering the null space of the first space as described above.

Figure 16:
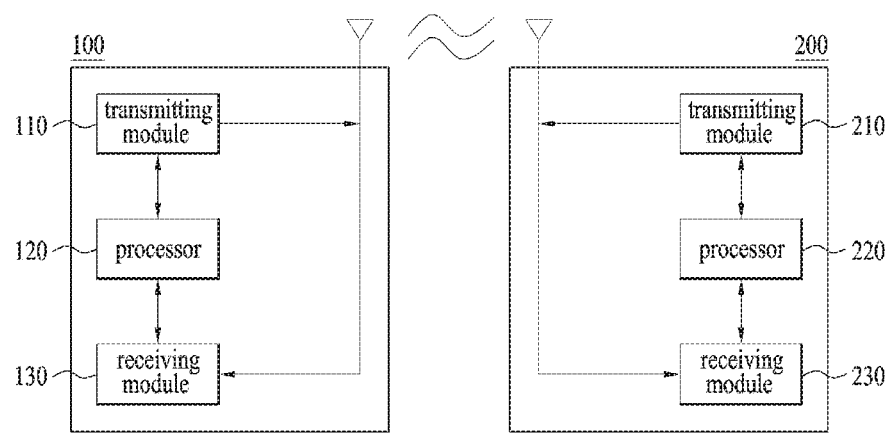
FIG. 16 is a block diagram illustrating a base station device and user equipment device according to an embodiment of the present invention.

FIG. 16 is a block diagram illustrating a BS device and UE device according to an embodiment of the present invention. A wireless communication system may include a BS device 100 and a UE device 200.

In this case, the BS device 100 may include a transmitting module 110 configured to transmit a radio signal, a receiving module 130 configured to receive a radio signal, and a processor 120 for controlling the transmitting and receiving modules 110 and 130. In addition, the BS device 100 may perform communication with an external device using the transmitting and receiving modules 110 and 130. In this case, the external device may be a UE device, and the UE device may include at least one of the above-described first-type and second-type UEs. Moreover, the transmitting module 110 may include the above-described closed-loop NOMA transmitter and open-loop NOMA transmitter. That is, the BS device 100 may be a device capable of communicating with the UE device 200 as the external device, but the present invention is not limited thereto.

In addition, the UE device 200 may include a transmitting module 210 configured to transmit a radio signal, a receiving module 230 configured to receive a radio signal, and a processor 220 for controlling the transmitting and receiving modules 210 and 230. In this case, the UE device 200 may perform communication with a BS using the transmitting and receiving modules 210 and 230. In this case, for example, the UE device 200 may be either the first-type UE or the second-type UE. Moreover, the receiving module 230 may include the aforementioned NOMA receiver. That is, the UE device 200 may be a device capable of communicating with the BS in the wireless communication system, but the present invention is not limited thereto.

In this case, for example, the processor 120 of the BS 100 may control the transmitting module 110 to transmit reference signals to first-type UEs based on type information on a plurality of UEs. In addition, the processor 120 may control the receiving module 130 to receive channel estimation information from the first-type UEs that receive the reference signals. Moreover, the processor 120 may create beams based on the received channel estimation information and then allocate resources for the beams. In this case, for example, when the resource for the beams are allocated, closed-loop beams for the first-type UEs may be first generated and then open-loop beams for the second-type UEs may be generated based on the generated closed-loop beams in a non-orthogonal manner. In this case, for example, the closed-loop and open-loop beams may be non-orthogonally allocated together in one resource region. Further, based on multiple antennas, the resource region may be divided into a first space including Nc closed-loop beams and a second space including No open-loop beams as described above. In this case, the second space may be configured based on the first space as mentioned in the foregoing description.

Additionally, although the above-described configurations have been arranged with reference to the BS, the configurations can be applied to the first-type and second-type UEs in the same manner.

In detail, after receiving allocation of a reference signal from the BS, a first-type UE may transmit channel estimation information to the BS. Thereafter, the first-type UE may receive a closed-loop beam transmitted from the BS. In this case, the first-type UE may receive only the closed-loop beam configured by the BS as described above.

In addition, a second-type UE may not receive allocation of a reference signal from the BS and receive an open-loop beam transmitted from the BS as described above. That is, the wireless communication system may be a system where the BS, first-type UE, and second-type UE can cooperate with each other according to the above-described configurations, but the present invention is not limited to the above-described embodiment.

The embodiments of the present invention mentioned in the foregoing description can be implemented using various means. For instance, the embodiments of the present invention can be implemented using hardware, firmware, software and/or any combinations thereof.

When implemented as hardware, a method according to embodiments of the present invention may be embodied as one or more application specific integrated circuits (ASICs), one or more digital signal processors (DSPs), one or more digital signal processing devices (DSPDs), one or more programmable logic devices (PLDs), one or more field programmable gate arrays (FPGAs), a processor, a controller, a microcontroller, a microprocessor, etc.

When implemented as firmware or software, a method according to embodiments of the present invention may be embodied as a module, a procedure, or a function that performs the functions or operations described above. Software code may be stored in a memory unit and executed by a processor. The memory unit is located at the interior or exterior of the processor and may transmit and receive data to and from the processor via various known means.

The preferred embodiments of the present invention have been described in detail above to allow those skilled in the art to implement and practice the present invention. Although the preferred embodiments of the present invention have been described above, those skilled in the art will appreciate that various modifications and variations can be made in the present invention without departing from the spirit or scope of the invention. For example, those skilled in the art may use a combination of elements set forth in the above-described embodiments. Thus, the present invention is not intended to be limited to the embodiments described herein, but is intended to accord with the widest scope corresponding to the principles and novel features disclosed herein. The present invention may be carried out in other specific ways than those set forth herein without departing from the spirit and essential characteristics of the present invention. Therefore, the above embodiments should be construed in all aspects as illustrative and not restrictive. The scope of the invention should be determined by the appended claims and their legal equivalents, and all changes coming within the meaning and equivalency range of the appended claims are intended to be embraced therein. The present invention is not intended to be limited to the embodiments described herein, but is intended to accord with the widest scope consistent with the principles and novel features disclosed herein. In addition, claims that are not explicitly cited in each other in the appended claims may be presented in combination as an embodiment of the present invention or included as a new claim by subsequent amendment after the application is filed.

In addition, both an apparatus invention and a method invention are explained in the present specification, and if necessary, the explanation on both the inventions can be complementally applied.

INDUSTRIAL APPLICABILITY

Although a method for allocating resources in a wireless communication system using multiple antennas and device therefor are mainly described with reference to examples applied to the 3GPP LTE system, the method and device can be applied to various wireless communication systems as well as the 3GPP LTE system.

What is claimed is:

1. A method for allocating resources by a base station in a wireless communication system using multiple antennas, the method comprising:
    classifying a plurality of user equipments (UEs) into first-type UEs and second-type UEs based on type information on whether the UE regularly transmits a signal;
    transmitting reference signals only to the first-type UEs;
    receiving channel estimation information from the first-type UEs that receive the reference signals;
    generating first-type beams for the first-type UEs and second-type beams for the second-type UEs based on the received channel estimation information; and
    allocating first resources for the first type beams and second resources for the second type beams,
    wherein the first-type beams are generated before the second-type beams, and the first-type beams are allocated resources in preference to the second-type beams,
    wherein the second-type beams are generated based on the generated first-type beams without channel estimation related to the second-type UEs in a non-orthogonal manner,
    wherein close loop layers are mapped to only the first-type beams for the first-type UEs among the first-type beams and the second-type beams, and
    wherein the second-type beams are applied to a hopping pattern determined based on a timing at which the second-type UEs are associated with the base station.

2. The method of claim 1, wherein the first-type and second-type beams are allocated together in one resource region in the non-orthogonal manner.

3. The method of claim 2, wherein the one resource region is divided into a first space including Nc of the first-type beams and a second space including No of the second-type beams based on the multiple antennas.

4. The method of claim 3, wherein after generation of the first space, the second space is generated based on the generated first space.

5. The method of claim 3, wherein the second space is divided based on a beam codebook.

6. The method of claim 3, wherein the No second-type beams included in the second space are transmitted based on a hopping pattern.

7. The method of claim 3, wherein the No second-type beams included in the second space are transmitted based on a spreading pattern.

8. The method of claim 1, wherein the first-type beams are closed-loop beams and the second-type beams are open-loop beams.

9. The method of claim 1, wherein the first-type UEs are human-type UEs and the second-type UEs are machine-type UEs.

10. The method of claim 1, further comprising receiving the type information on each UE from the plurality of UEs.

11. The method of claim 10, wherein the type information on each UE is received through a physical uplink shared channel (PUSCH).

12. A base station (BS) for allocating resources in a wireless communication system using multiple antennas, the BS comprising:
    a transmitter;
    a receiver; and
    a processor controlling the transmitter and the receiver,
    wherein the processor is configured to:
    classify a plurality of user equipments (UEs) into first-type UEs and second-type UEs based on type information on whether the UE regularly transmits a signal;
    control the transmitter to transmit reference signals only to the first-type UEs;
    control the receiver to receive channel estimation information from the first-type UEs that receive the reference signals;
    generate first-type beams for the first-type UEs and second-type beams for the second-type UEs based on the received channel estimation information; and
    allocate first resources for the first type beams and second resources for the second type beams,
    wherein the first-type beams are generated before the second-type beams, and the first-type beams are allocated resources in preference to the second-type beams,
    wherein the second-type beams are generated based on the generated first-type beams without channel estimation related to the second-type UEs in a non-orthogonal manner,
    wherein close loop layers are mapped to only the first-type beams for the first-type UEs among the first-type beams and the second-type beams, and
    wherein the second-type beams are applied to a hopping pattern determined based on a timing at which the second-type UEs are associated with the BS.

13. The BS of claim 12, wherein the first-type and second-type beams are allocated together, by the processor, in one resource region in the non-orthogonal manner.

14. The BS of claim 13, wherein based on the multiple antennas, the one resource region is divided, by the processor, into a first space including Nc of the first-type beams and a second space including No of the second-type beams.

15. The BS of claim 14, wherein after generation of the first space, the second space is generated, by the processor, based on the generated first space.

* * * * *